(12) United States Patent
Mujunen et al.

(10) Patent No.: US 9,115,317 B2
(45) Date of Patent: Aug. 25, 2015

(54) OIL RECOVERY METHOD

(75) Inventors: Miia Mujunen, Helsinki (FI); Ossi Pastinen, Kantvik (FI); Ilkka Lehtomaki, Helsinki (FI); Simo Laakso, Turku (FI); Perttu Koskinen, Helsinki (FI)

(73) Assignee: Neste Oil Oyj, Espoo (FI)

( * ) Notice: Subject to any disclaimer, the term of this patent is extended or adjusted under 35 U.S.C. 154(b) by 597 days.

(21) Appl. No.: 13/399,186

(22) Filed: Feb. 17, 2012

(65) Prior Publication Data

US 2012/0220509 A1 Aug. 30, 2012

Related U.S. Application Data

(60) Provisional application No. 61/443,908, filed on Feb. 17, 2011.

(30) Foreign Application Priority Data

Feb. 17, 2011 (EP) ..................... 11154768

(51) Int. Cl.
*B01D 11/04* (2006.01)
*C02F 1/26* (2006.01)
(Continued)

(52) U.S. Cl.
CPC ............ *C10G 53/04* (2013.01); *B01D 11/0492* (2013.01); *C02F 1/26* (2013.01);
(Continued)

(58) Field of Classification Search
CPC .... B01D 11/00; B01D 11/04; B01D 11/0492; B01D 36/00; B01D 37/00; B01D 23/16; C02F 1/26; C02F 1/40; C02F 1/66; C02F 9/00; C02F 2103/322; C10G 17/00; C10G 17/02; C10G 17/04; C10G 31/09; C10G 53/04; C10G 53/10; C10G 2400/04; C10G 1/04; C11B 1/10; C11B 3/04; C11B 3/008; C11B 3/006; C11B 3/16

USPC ......... 210/634, 638, 639, 806; 554/175, 212; 44/307, 605; 585/240
See application file for complete search history.

(56) References Cited

U.S. PATENT DOCUMENTS 3,574,329 A * 4/1971 Beavon ..................... 210/794
3,803,031 A * 4/1974 Keller, Jr. .................. 210/662
(Continued)

FOREIGN PATENT DOCUMENTS

| EP | 0062527 | 10/1982 |
|---|---|---|
| EP | 1396531 | 3/2004 |

(Continued)

OTHER PUBLICATIONS

Publication: "Feedstock and Biodiesel Characteristics Report", Sanford et al, Published by Renewable Energy Group, Ames, Iowa; Publication Date: Nov. 17, 2009, pp. 1-136.*
(Continued)

*Primary Examiner* — Joseph Drodge
(74) *Attorney, Agent, or Firm* — Andrus Intellectual Property Law, LLP

(57) ABSTRACT

The invention relates to a method for the recovery of oil from an aqueous solution containing oil and solids, as well as to the use of products obtained by this method. The method of the invention comprises at least the following steps of: Adjusting the oil- and solids-containing aqueous solution to a pH which is acidic, separating an oil- and solids-containing fraction from the acidic aqueous solution with an separation agent which is hydrophilic or assumes a hydrophilic character in response to water, recovering the oil- and solids-containing fraction separated by means of said separation agent, extracting oil away from the solids with a water-insoluble extraction agent, and recovering the oil-containing water-insoluble extraction agent.

11 Claims, 2 Drawing Sheets

(51) Int. Cl.
*C02F 1/66* (2006.01)
*C10G 1/04* (2006.01)
*C10G 17/00* (2006.01)
*C10G 53/04* (2006.01)
*C11B 1/10* (2006.01)
*C11B 3/04* (2006.01)
*C10G 31/09* (2006.01)
*C10G 53/10* (2006.01)
*C10L 1/02* (2006.01)
*C10L 1/08* (2006.01)

(52) U.S. Cl.
CPC .. *C02F 1/66* (2013.01); *C10G 1/04* (2013.01); *C10G 17/00* (2013.01); *C10G 31/09* (2013.01); *C10G 53/10* (2013.01); *C10L 1/026* (2013.01); *C10L 1/08* (2013.01); *C11B 1/10* (2013.01); *C10G 2400/04* (2013.01); *C10G 2400/10* (2013.01)

(56) References Cited

U.S. PATENT DOCUMENTS

| | | | | |
|---|---|---|---|---|
| 3,830,789 | A * | 8/1974 | Garrett et al. | 530/208 |
| 4,073,729 | A * | 2/1978 | Kraemer et al. | 210/793 |
| 7,692,050 | B2 * | 4/2010 | Adams et al. | 585/240 |
| 2004/0094477 | A1* | 5/2004 | Lysenko et al. | 210/634 |
| 2008/0305531 | A1* | 12/2008 | Lam et al. | 435/142 |
| 2010/0197029 | A1* | 8/2010 | O'Fallon et al. | 436/71 |
| 2011/0042318 | A1* | 2/2011 | Painter et al. | 210/664 |
| 2011/0192073 | A1* | 8/2011 | Kale | 44/307 |
| 2012/0073184 | A1* | 3/2012 | Cranford et al. | 44/307 |

FOREIGN PATENT DOCUMENTS

| | | |
|---|---|---|
| EP | 1398364 | 3/2004 |
| EP | 1741767 | 1/2007 |
| GB | 692704 | * 2/1950 |
| GB | 1098716 | 1/1968 |
| GB | 2023120 | 12/1979 |
| JP | 57136989 | 8/1982 |
| WO | 9322023 | 11/1993 |
| WO | 2005077485 | 8/2005 |

OTHER PUBLICATIONS

Goh et al., "Palm-based biofuel refinery (PBR) to substitute petroleum refinery: An energy and emergy assessment", Renewable and Sustainable Energy Reviews, 2010, 14:2986-2995.

Poh et al., "Development of anaerobic digestion methods for palm oil mill effluent (POME) treatment", Bioresource Technology, 2009, 100:1-9.

Wicke et al., "Different pal oil production systems for energy purposes and their greenhouse gas implications", Biomass and Bioenergy, 2008, 32:1322-1337.

Wah et al., Pre-treatment and membrane ultrafiltration using treated palm oil mill effluent (POME), J. Sci. Technol., 2002, 24(Suppl.): 891-898.

Wu et al., "A holistic approach to managing palm oil mill effluent (POME): Biotechnological advances in the sustainable reuse of POME", Biotechnology Advances, 2009, 27:40-52.

European Search Report for EP11154768 dated Jul. 15, 2011.

Ahmad, A.L. et al, Adsorption of residue oil from palm oil mill effluent using powder and flake chitosan: Equilibrium and kinetic studies, Water Research, 2005, vol. 39, pp. 2483-2494.

Ahmad, A.L. et al, Coagulation of residue oil and suspended solid in palm oil mill effluent by chirosan, alum and PAC; Chemical Engineering Journal, 2006, vol. 118, pp. 99-105.

Ngarmkam, Worawan et al, Magnetic composite prepared from palm shell-based carbon and application for recovery of residual oil from POME, Journal of Environmental Management, 2011, vol. 92, pp. 472-479.

International Search Report mailed Jul. 4, 2012, for International Application No. PCT/FI2012/050155, filed Feb. 16, 2012.

Written Opinion mailed Jul. 4, 2012, for International Application No. PCT/FI2012/050155, Feb. 16, 2012.

* cited by examiner

OIL RECOVERY METHOD

CROSS-REFERENCE TO RELATED APPLICATIONS

The present application claims the benefit of priority under 35 U.S.C. §119(e) to U.S. Provisional Patent Application No. 61/443,908, filed on Feb. 17, 2011, the content of which is incorporated herein by reference in its entirety.

FIELD OF THE INVENTION

The invention relates to a method for the recovery of oil from an aqueous solution containing oil and solids, as well as to the use of products obtained by this method. In particular, the invention concerns a method for the recovery of oil from an aqueous solution containing plant-derived material. More specifically, the invention relates to the separation of oil from the effluent of a vegetable oil pressing plant, such as from the effluent of a palm oil mill.

BACKGROUND

Plant-derived oil can be produced from seeds which contain, oil, and from oleaginous fruits such as palm fruits. The production of fruit oil is most generally practiced by using a wet pressing method. As a side fraction, wet pressing yields a colloidal suspension, consisting of water-soluble components of fruit and a material suspended in water, particularly fibers and oil. In palm oil production, this colloidal suspension, palm oil mill effluent (POME), contains typically 95 to 96% water, about 1% oil, and has a total dry content of 4 to 5%, of which the suspended matter makes up 2 to 4%. Main sources of solids include sterilizer condensate, separator sludge or oil clarifier, and hydrocyclone effluent.

Even on the basis of its composition, it is possible to conclude that POME produces quite a considerable biochemical and chemical effluent load. It has been presented in the literature that the chemical oxygen demand (COD) of POME varies typically within the range of 30 to 100 $g_{COD}/L$ and the biological oxygen demand, in turn, is typically about 25 to 60 $g_{BOD}/L$. The palm oil wet pressing process consumes plenty of water and produces a large quantity of POME. A few properties of POME are presented in the following table 1.

TABLE 1

Properties of POME.

| Property | Sample1 | Sample 2 |
|---|---|---|
| pH | 3.6 | |
| BOD | 53-57 g/l | 38-39 g/l |
| $COD_{soluble}$ | 31 g/l | 19 g/l |
| $COD_{total}$ | 84 g/l | 43 g/l |
| Dry matter (volatile suspended solids) | 40 g/l | |
| $N_{total}$ | 1.1 g/l | 0.4 g/l |
| $P_{total}$ | 0.11 g/l | 0.98 g/l |

Depending on the pressing process, the output of POME ranges from one ton to as much as four tons per one ton of palm oil mass produced, or from half a ton to one ton per ton of fruit bunches processed. Prior to its subsequent effluent treatment, POME is typically acidic and has its pH varying within the range of 3.0 to 6.5.

The production of palm oil has increased rapidly all over the world. Most important uses of palm oil include food applications (about 80% of the produced oil), the production of oleochemicals and soaps (about 15%), as well as the production of biofuels (less than 5%). As the production of palm oil is highly extensive worldwide, about 40 million tons a year, the amount of resulting POME is respectively as large as more than 100 million tons a year.

Regarding the treatment of POME, there have been proposed numerous, even large-scale adaptable methods, such as anaerobic treatment, aerobic microbial processes, and bioreactors based on membrane technology. Various methods for the treatment of POME have been described in the article Poh P E, Chong M F. 2009. (Development of anaerobic digestion methods for palm oil mill effluent (POME) treatment. Bioresource Technology 100: 1-9). Goh et al. 2010 have proposed palm-based biofuel refinery (PBR) and production of renewable biofuel, such as biodiesel and bioethanol from CPO and lignocellulosic residues (Goh C S, Lee K T. Palm-based biofuel refinery (PBR) to substitute petroleum definery: An energy and emergy assessment. Renewable and sustainable energy reviews. Vol. 14, No. 9, December 2010, pages 2986-2995). Wicke at al. 2008 have analysed the greenhouse gas emissions (GHG) of crude palm oil (CPO) and palm fatty acid distillate (PFAD) production and their co-firing with natural gas for electricity production. They have described also the conversion of crude palm oil to biodiesel and the associated GHG emissions (Wicke B, Dornburg V, Junginger M and Faaij A. Different palm oil production systems for energy purposes and their greenhouse gas implications. Biomass and bioenergy 32 (2008)1322-1337). Typically, the treatment of POME is conducted at palm oil mills by using anaerobic as well as aerobic effluent tanks and combinations thereof for reducing the organic load of POME to an acceptable level. The organic matter of POME produces methane upon degradation in anaerobic conditions in anaerobic ponds. As for now, the resulting methane is not always collected from anaerobic ponds and it escapes into the atmosphere. This is a source of major greenhouse gas emissions as methane is a greenhouse gas 23 times more powerful than carbon dioxide. In light of these figures, it is obvious that the treatment of POME on principles that are environmentally friendly and comply with sustainable development is a remarkable challenge.

Accordingly, there is a particular need for a treatment method, which enables both recovering oil from the effluent of a fruit pressing plant and concurrently reducing the environmental burden of this effluent.

Sand filtration is included in prior known POME purifying treatments, used especially as a pretreatment method in combination with other post-treatment techniques. Prior known is a technique (Wong, P. W., Nik, M. S., Meenakshisundaram, N., Balaraman, V. Songklanakarin J. Sci. Technol., 2002, 24:891-898), wherein sand filtration is applied as a pretreatment of POME prior to the actual ultrafiltration-based purifying process. However, the method description does not include processes which would indicate a continued treatment of the fraction obtained in sand filtration for separating oil from filtration residue, and, therefore, the method specifically does not comprise a process in which the use of sand filtration is repeated for the recovery of oil.

Sand filtration is used not only for the purification of POME but also other oil-water suspensions. Publication EP0062527 A2 (1982-10-13) discloses a method of separating oil from water emulsion by filtering it through silylated sand. The method also describes a step of separating oil from sand by means of reflux washing.

Sand filtration is an economically feasible option for the separation of oil from water, especially when there is a low concentration of oil or oleiferous components. This type of method is known from publication JP57136989 A (1982-08-24), which describes the purifying of waste water by using a sand bed with adjuvants added therein.

The use of organic solvents is known for the removal of palm oil from POME. In publication GB2023120 (1979-12-28), the object of separation is POME as such, meaning that there are immense volumes of aqueous solution to be extracted.

BRIEF DESCRIPTION OF THE INVENTION

The present invention provides a treatment method, which enables both the recovery of oil from effluent and concurrently the reduction of an environmental burden caused by this effluent. In order to achieve this objective, the invention is characterized by features presented in the independent claim. Other claims present a few preferred embodiments of the invention.

The invention is directed to a method for the recovery of oil from an aqueous solution containing oil and solids. The method according to the invention comprises at least the following steps of:

adjusting an oil- and solids-containing aqueous solution to an acidic pH, separating an oil- and solids-containing fraction from the acidic aqueous solution with an separation agent which is hydrophilic or assumes a hydrophilic character in response to water, recovering the oil- and solids-containing fraction separated by means of said separation agent, extracting oil away from solids with a water-insoluble extraction agent, and recovering the oil-containing water-insoluble extacting agent.

Thus, according to the invention, the oil- and solids-containing aqueous solution is first adjusted to make it acidic, followed by separating solids, with oil adsorbed thereto, by filtering said aqueous solution with an separation agent, which is hydrophilic or assumes a hydrophilic character in response to water. The solids can be organic as well as other than organic. In this application, adjusting to make it acidic refers to the fact that the pH value is either measured or known beforehand and provides a basis for making the pH value appropriate for the method. The pH value adjustment is conducted by using agents appropriate for each aqueous solution. In a preferred case, the solids-containing aqueous solution has its pH adjusted to within the range of 2.0 to 6.0.

The oil- and solids-containing fraction adhered to the surface of an separation agent is recovered and subjected to extraction with a water-insoluble extraction agent. The resulting mixture, which contains the solids, the water, and the water-insoluble extraction agent with oil dissolved therein, can be preferably treated for separating the solids. From the substantially particle-free mixture, which has formed after the separation of solids, is separated the water-insoluble extraction agent or the aqueous phase, and as a final step, the oil is separated from the water-insoluble extraction agent. Preferably, the water-insoluble extraction agent is in a liquid form during the extraction process, and the oil is separated from said water-insoluble extraction agent by evaporating the water-insoluble extraction agent.

Hence, the method incorporates an insight of integrating various individual operations in such a way that, when carried out according to the invention, said operations enable the separation of oil in a manner which is technically and economically decisively improved with respect to the prior art. In addition to the recovery of oil, the invention provides a benefit of being able to remove also other organic matter, such as polymeric carbohydrates, from an aqueous solution. The removal of oil and polymeric carbohydrates reduces significantly the organic load of effluent and facilitates its handling.

The invention is based on a surprising finding that oil is predominantly adsorbed to solid matter particles, such as e.g. to naturally occurring carbohydrate-rich vegetable solid matter particles contained in acidic POME. This finding led to the invention that, as a result of adsorbed oil, the solid matter particles assume a hydrophobic character, enabling the recovery thereof by filtering an oil-containing aqueous solution through a hydrophilic separation agent, because the discussed hydrophobic solid matter particle mass concentrates on top of the separation agent as water-bearing mass capable of separating from the separating agent in response to a hydrophile-lipophile interaction.

According to one aspect of the invention, the addition of an oil dissolving agent into a solid matter mass collected from the surface of an separation agent enables the establishment of a multiphase system, wherein the oil proceeds from the solid matter particles into the oil dissolving phase, and from which multiphase system a phase of solid matter particles relieved of oil is separable by means of repeated filtration. Thus, the filtrate from the latter filtration according to the invention enables a transition from the multiphase system to a water-oil two-phase system, which undergoes passively a phase separation for an oil-water two-phase system, from which the oil phase is recovered.

Another inventive feature in the method is its ability, if necessary, to make use of preferred method operations and materials, such as sand in filtrations, spontaneous phase separation, and, on the other hand, to avoid drying and dewatering methods. Preferably, said separation agent consists of sand with a grain size of 0.05 to 4 mm.

Still another inventive aspect in the method is the ability to separate an aqueous phase cost effectively from insoluble ingredients contained therein.

One inventive feature of the method comprises a string of procedures, wherein the recovered aqueous particle material left on top of the sand bed is supplemented with an oil extraction component, the mixture is conveyed again into the separation agent, the liquid component migrated through the separation agent is recovered, a phase separation is allowed to occur therein, the component that has extracted oil is recovered, the component that has extracted oil is removed, and the remaining oil is recovered.

According to one embodiment of the invention, the lignin present in solid matter mass following the oil separation is predominantly separated from other organic matter and utilized as such or further processed into various products, such as polymers and chemicals for fuel application. The lignin contained in solid matter mass is a slowly biodegrading material, has a high caloric value, and is thereby beneficial from the standpoint of combustion. The solid matter mass can be dried prior to combustion.

According to one aspect of the invention, said aqueous solution consists of palm oil mill effluent (POME). Accordingly, the invention comprises a novel method for the separation of oil and other solids from a POME stream with a low volumetric oil content in POME, for using the oil in natural palm oil applications, for utilizing oil-free plant-derived particles as biomass or a soil improver, as well for reducing the biological load of water contained in POME.

A particular benefit of the invention is its capability of using simple technical solutions to produce remarkable quantities of palm oil from POME, a low rated side stream of palm oil production.

The method according to the invention enables an efficient recovery of oil. The oil in POME is present both in an easily removable form, but also firmly adsorbed to solids, a plant matrix, from which the separation of oil is more difficult by clarification or mechanical treatments. The method provided by the invention enables the separation of both readily removable and firmly adsorbed oil from POME.

Accordingly, one individual inventive feature in a method of the invention is the fact that it comprises an insight of integrating the palm oil recovery from POME streams by using a method which at the same time both reduces substantially the biological load of an aqueous phase remaining in POME and produces both oil and water-insoluble oil-free biomass for renewed use. Hence, the invention is based on integrating the following insights for a unified method. In the palm oil production process, POME is typically acidic by nature, which diminishes the solubility of oil in water and promotes the oil adsorption to surfaces. The plant particles rich in carbohydrates, contained in POME and poorly soluble in water, establish opportune adsorption surfaces for oil as its solubility in water decreases with the solution becoming increasingly acidic. The amount of particles in a POME stream is by nature sufficient for adsorbing the POME-contained oil almost in its entirety. Due to adsorbed oil, the carbohydrate-rich plant particles assume a hydrophobic character, repel silicate-containing or the like hydrophilic materials and surfaces, and thereby, in filtration, tend to separate as a layer on the boundary surface between hydrophilic materials and POME. Hence, this enables the oil, contained at a low concentration in POME, to be separated from the water phase and to be used as palm oil for its typical applications, and to reduce the biological oxygen demand of POME, as well as to enable renewed use of the water phase. One of the inventive features of the method is essentially utilization of the natural acidity of POME, which decreases the solubility of oil in water and increases its tendency of adsorbing to other water-insoluble components of a colloidal solution. At the same time, there will be less need to supplement POME streams with salt-forming acidity regulators.

Another benefit gained by a method of the invention is that its individual unit operations produce fractions which are suitable for various applications as such or in surplus value forms. The recovered palm oil is applicable to any inherent usage applications of palm oil or preferably for the production of renewable transportation fuel. The biological solids particle mass, i.e. the carbohydrate-rich and low oil particles contained in POME, is applicable to renewed use as such or after processing, such as for use as a soil improver or for combustion.

The separation of solids made up predominantly by solid plant matter diminishes significantly the organic load of POME. Consequently, POME is easier to treat in effluent treatment, and thereby methane resulting from anaerobic decomposition, and eventual greenhouse gas discharges caused thereby, will be reduced. The plant matter, absorbed in the separation agent during filtration, can be recovered and put to useful service, for example by composting, and the compost can be used as a soil improver in palm oil plantations. Both sand and solids bonded thereto can be treated at the same time, without separating the sand and the solids from each other, and be used as a soil improver as such or after a composting process. The solids in POME contain not only carbohydrates but also lignin (Wu T. Y., Mohammad A. W., Jahim J. M., Anuar N. 2009. Holistic approach to managing palm oil mill effluent (POME). Biotechnological advances in the sustainable reuse of POME. Biotechnology Advances 27 (2009) 40-52.

The biological burden of water produced by the invention diminishes and is useful as a recycling stream in palm oil production or as a stream used for irrigation, as a soil improver or a fertilizer supplement. It is possible that water be further processed and purified by using prior known POME treatment methods and be used as a recycling stream in palm oil production or as a stream used for irrigation, as a soil improver or a fertilizer supplement, or the purified water can be released into the environment.

Hence, a significant overall benefit gained by the invention is that the oil recovery enabled thereby can be used for reducing the dry matter content of POME and to thereby decrease the biological and chemical load of POME. Alternatively, a method of the invention enables an efficient recovery of oil from POME before the prior known further treatments of POME. This, in turn, facilitates the further treatment of POME, as well as reduces the amount of greenhouse gases, especially methane, generated in anaerobic decomposition.

Another economically important advantage offered by a method of the invention is that the method enables a recovery of biomass fractions and water useful for other purposes. Thus, the invention provides a comprehensive solution for upgrading the production process in terms of its environmental friendliness and economic sense.

The method according to the invention is simple, modest in terms of equipment required therefor, and thereby attractive in terms of its investment costs. Implementation of the method does not require any special skills, either. The method is modest in terms of its energy demand, it is low in practice as regards its emissions, the commodities needed therefor are recyclable in the process, and the side streams produced thereby, such as oil, other biomass, and water, can be used for surplus value producing applications. The method does not impose any particular restrictions regarding its implementation environment and it can be practiced for example in connection with palm oil production processes. The solution phase, i.e. the water phase, produced by the process lends itself better to reuse e.g. in palm oil production.

One specific benefit gained by a method of the invention is its applicability to be implemented in an arbitrarily selected scale and hence to be utilized in processes regardless of the orders of magnitude thereof and the amounts of effluent streams generated therein.

The adjustment of a process according to the invention is simple, and no extraordinary adjustment procedures are necessitated by the oil content or the amount of insoluble substances. Thus, the method does not impose restrictions regarding the composition or adjustment of effluent supplied therein.

According to the invention, it is also possible to integrate the POME streams of various palm oil processes with filtration, as well as with solids recovery. Likewise, according to the invention, it is possible to combine oil- and solids-comprising fractions recovered by filtration and obtained from various palm oil mills and to separate the oil therefrom in a centralized fashion.

Another benefit of the invention is that the method provided thereby can be applied not only to POME but also to other colloidal, preferably acidic liquid streams, the method being especially useful whenever these streams contain oil and other matter poorly soluble in water.

The method according to the invention can be applied also to the treatment of wood based, lignocellulose containing effluents from pulp and paper industry, effluents containing agricultural biomass, such as straw biomass, effluents from corn oil separation from corn ethanol process and effluents from food industry.

Another advantage of the invention is that characteristic steps included therein, individual operations, can be carried out and combined with each other to the extent necessary in a particular case for the recovery of oil contained in the effluent.

The oil recovered by a method described in the invention can be used for the same applications as the oil produced by the actual process. Preferably, the recovered oil is used as raw materials for the production of oleochemicals, soaps. Preferably, the oil is employed as a biofuel or a lubricant, as a raw material and/or components therefor. The recovered oil can be used as a raw material in the production of biodiesel or renewable diesel. In the production process of renewable transportation fuel, the oil is hydrogen treated, as well as possibly also isomerized or subjected to other process operations. The production process of renewable transportation fuel is typically used for producing components suitable for diesel, in which case the product is referred to as renewable diesel, or diesel made from renewable raw materials. However, instead of or in addition to components suitable for diesel, the production process of renewable transportation fuel can also be used for producing components suitable for gasoline or jet fuel. Biodiesel consists of alkyl esters and is commonly produced by transesterification. In transesterification, the acylglycerols present in the oil are refined into long chain alkyl esters.

SPECIFIC DESCRIPTION OF THE INVENTION

Figure 1:
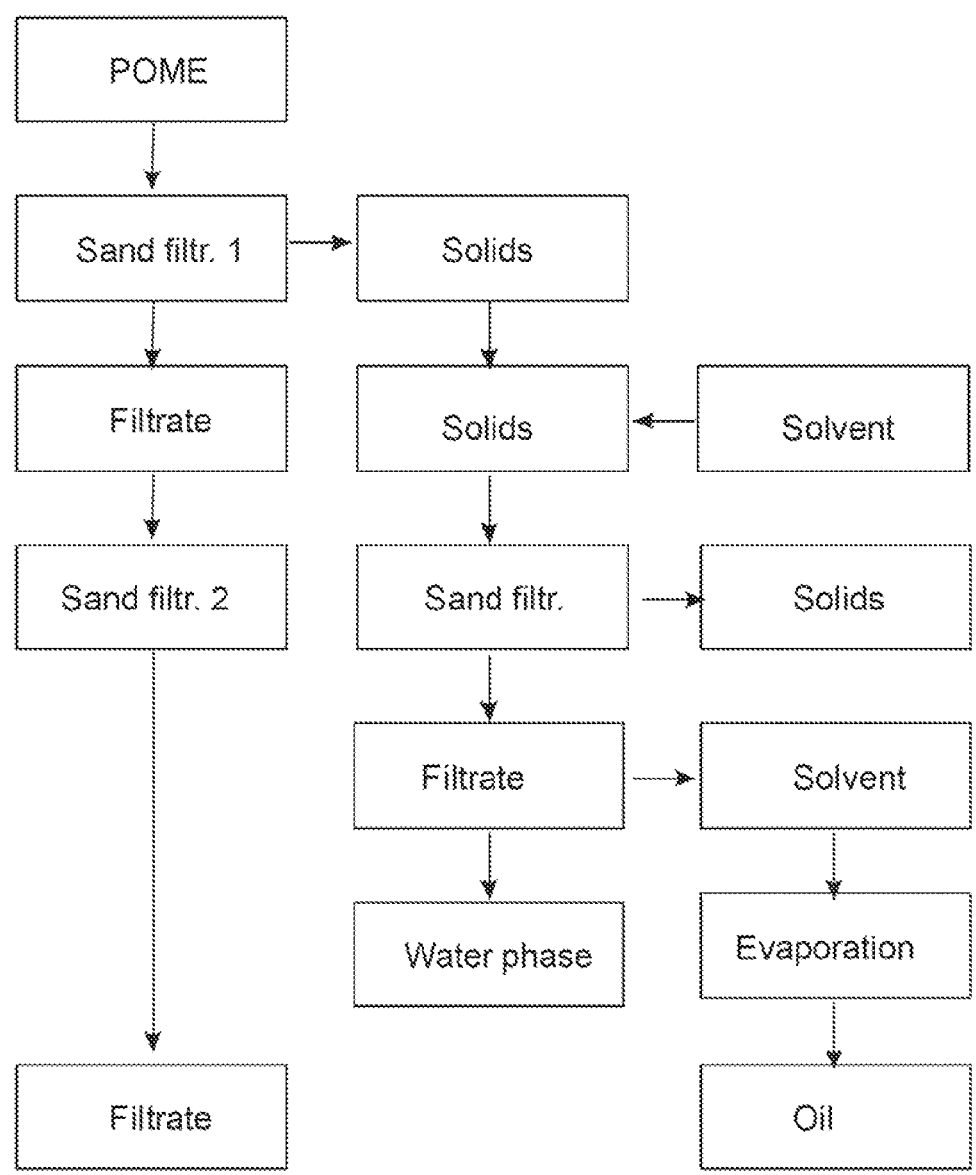
FIG. 1 provides a chart of a method for the production of palm oil from liquid side streams of palm oil production, especially from POME. POME: Dry content: 62 g/l; Dry content: 6.3% of wet weight; Fat content: 17% of dry matter; Fat: 10.5 g/l; pH: 3.74; Volume: 150 ml; Mass: 143.7 g. Sand 1: Grain size: 0.1-0.3 mm; Mass: 129.6 g; Estimated mass in wet state (water absorption 1.22× dry weight): 160.0 g; Estimate for absorbed water: 28 g. Solids: Dry content: 12% of wet weight; Fat content: 18% of dry matter; Mass obtained by scraping, wet weight: 36.9 g. Filtrate 1: Dry content: 38 g/l; Fat content: 0.1% of dry matter; Volume: 68 ml; Mass: 67.5 g. Filtrate 2: Dry content: 38 g/l; Fat content: 0.1% of dry matter. Solvent: 2:1 dichloromethane-methanol; Volume: 20 ml. Leached POME solids: Fat content: 6.5% of dry matter. Oil: Mass: 0.303 g; Yield from the fat of POME: 19%; Fat yield, mass corrected: 0.525 g; Yield from the fat of POME: 33%.

The invention concerns a method of recovering oil from an aqueous solution containing oil and organic solids, generated for example in the wet pressing of seed or fruit oils, for example in the production processes of palm oil, coconut oil, avocado oil, or olive oil. In addition, aqueous solutions containing oil and organic solids are created for example in food industry processes.

According to one aspect of the invention, in a particularly preferred case, the oil is recovered from a solids-containing aqueous solution, in which the amount of solids and oil is low with respect to the amount of water, the amount of oil being typically 0.3 to 2% by weight and the amount of solids being 1 to 6% by weight.

Preferably, the invention is suitable for the recovery of oil from particle-containing aqueous solutions, which are acidic by nature, pH typically 3 to 6, whereby pH needs not necessarily be adjusted. The acidic pH promotes the adsorption of oil to solid particles and increases the hydrophobicity thereof.

According to the invention, the employed separation agent is a material, which is hydrophilic or assumes a hydrophilic character in response to water. Because of this property, solids are repelled by the separation agent.

One embodiment of the invention comprises a treatment of POME for the recovery of oil, said POME possibly originating from one or more individual operations of palm oil production, or possibly being a mixture which has been created by combining streams released from various individual operations of this production. To put it another way, the invention comprises POME, which contains not only water but also a biomaterial poorly soluble therein in the form of solid particles, which are in a state dispersed in water or make up an emulsion with water as an external phase, or which can be brought in this state by treating mechanically or chemically, or which are in some other state that enables the flowing of solid matter particles along with water. The invention is also suitable for other types of water containing solid particles as long as any of the foregoing characteristic features is fulfilled.

The characterizing feature in one preferred embodiment of the invention is that it comprises steps of treating POME preferably in the form of an acidic solution, which can be acidic by nature or made acidic, conveying the acidic POME solution into a sand bed or another material with a hydrophilic surface, or into a material which assumes a hydrophilic character in response to water contained in POME. Solids retained on the separation agent's surface are recovered, and oil is separated from the solids. The term adjusted to be acidic refers to making a solution acidic, e.g. by the addition of a substance which lowers the solution's pH value, or to the fact that a solution is acidic by nature or as a result of microbiological activity and the solution's acidity has been verified, e.g. by measuring the pH.

For separating oil from solids, the latter is supplemented with an oil extraction agent and the mixture is treated with known techniques to provide a phase transition of oil from the solid particles of plant material to the oil extraction agent.

The resulting multiphase mixture, which contains water, solid matter particles, and oil in its extracted phase, is converted into a two-phase mixture by separating the solid matter components by another filtration separating the solid particles, preferably by another sand filtration.

Instead of or in addition to sand, the oil-containing water can be filtered by using other materials as well, particularly materials, which are hydrophilic or which assume a hydrophilic character in response to water. The employed separation agent may comprise organic, as well as synthetic or semi-synthetic materials. Instead of or in addition to sand, the filtration of water can be performed by having the separating agent consisting of soil types with a grain size larger than that of sand, for example gravel or rubble, or respectively by using separation agents with a grain size smaller than that of sand, for example silt or clay materials. Various separation agents can be arranged in the filtration bed in any disposition. For example, the filtration bed may include layers of different grain size or mixtures of varying grain sizes in any disposition whatsoever.

The filtrate results in a water-oil two-phase system, wherein one phase is water and the other is a mixture of oil and a water-insoluble extraction component that was used for extracting it. The phases are separated and from the oil-containing phase is removed the water-insoluble component that was used for extracting it, and the remaining oil is recovered.

One of the characterizing features of a method according to one aspect of the invention is that it comprises one, a few, or all of the following steps of:

Treating POME as an acidic dispersion

Conveying POME into a filtration bed, the separation agent of said bed containing a material with a hydrophilic character over its surface or which material assumes a hydrophilic character in response to water, whereby it holds off water-insoluble substances by developing a water layer on the surfaces of the separation agent Selecting the separation agent in such a way that, in addition to the preceding item, it retains a particle type material Recovering a biomass left on the surface of the separation agent Further processing a liquid that has migrated through the bed from POME that was conveyed into the separation agent Performing an oil separation from the recovered biomass, solid particle mass Establishing a two-phase system (water-oil)

Reusing solids left after of the oil separation

Burning, composting and utilizing the biomass left after the oil separation as a soil improver, by anaerobic digestion and burning or utilizing the resulting biogas Using the oil obtained in the oil separation for making biodiesel, renewable transportation fuel, oleochemicals or soaps, or in food applications, especially for making renewable transportation fuel Using a sand bed as the separation agent Within the scope of its characterizing features, the invention can be practiced in a variety of embodiments. A common feature included in all these embodiments is a step of recovering water-insoluble or poorly water-soluble biomass in the form of solid matter particles, conducting a phase transition of oil from the biomass to an oil extraction phase, recovering the oil-containing extraction phase, and separating the oil therefrom.

One specific feature of the invention is that the oil recovered from POME according to the invention is used for making renewable transportation fuel.

DEFINITIONS

"Biofuel" refers to a solid, liquid, or gaseous fuel, which originates from biomass or biowaste and which differs from fossil fuels, the latter originating from the organic residues of prehistoric plants, animals, or micro-organisms.

"Biodiesel", according to EU directive 2003/30 EC, refers to diesel-grade methyl ester useful as biodiesel and produced from plant- or animal-based oil. in the present context, the term "biodiesel" refers more broadly to diesel-grade long chain alkyl esters, such as methyl, ethyl, or propyl esters which can be produced from vegetable oils, animal fats, or microbial lipids, or from mixtures thereof, whereby the source of microbial lipid may be yeast, mold, algae, a bacterium, or some other micro-organism, including genetically engineered micro-organisms.

The terms "renewable transportation fuel" or "transportation fuel produced from renewable raw materials" refer in this context to a fuel, which is manufactured with a hydrogen treatment from plant, animal, or microbial lipids, or from a mixture thereof, the possible source of microbial lipid being yeast, mold, algae, a bacterium, or some other micro-organism, including genetically modified micro-organisms. Renewable transportation fuel can be manufactured also from waxes, which have been produced by biomass gasification and Fischer-Tropsch synthesis. Optionally, the manufacture of renewable transportation fuel can be conducted by using not only a hydrogen treatment but also isomerization or some other processing operations. The manufacturing process of renewable transportation fuel can be used for producing not only components suitable for diesel but also components suitable for gasoline or aviation fuel. The manufacturing process for renewable transportation fuel has been described for example in patent publications EP 1396531, EP1398364, EP 1741767, and EP 1741768.

The term "lubricant" refers in this context to a material such as fat, grease, lipid, or oil, which reduces friction between two surfaces moving relative to each other. In addition to reducing friction, the purpose of a lubricant may be the distribution and elimination of generated heat, as well as the elimination of impurities.

The term "sand" refers in this context particularly to a material, having its grain size (particle size) varying within the range of 0.5 to 4 mm. The sand which is preferably used as an separation agent according to the invention, is hydrophilic or assumes a hydrophilic character in response to water.

The material assuming a hydrophilic character in response to water refers to a substance, the hydrophilicity of which increases as water develops a film on the surface of the substance, such as for example paper when it becomes wet.

In one preferred embodiment according to the invention, acidic POME is conveyed into a sand bed, onto the surface of a sand bed, or into its upper portions, the aqueous phase of POME and components dissolved therein are allowed to migrate through the sand bed. Some of the solids retained on the sand bed surface or in the vicinity of the surface are recovered and the solids-free water is conducted to reuse or further processing. A part of this embodiment of the invention is that the remaining solids are subjected to oil recovery. Oil can be separated from the solids by any prior known method, preferably by methods which have been applied to the separation of oil contained in a plant-based material, such as by extracting with organic solvents, or, in a broad sense, by methods which enable establishing mutually separable water-soluble and water-insoluble oil containing phases. However, the basic embodiment of the invention comprises a step of blending an oil extraction agent within water-containing solid particle mass obtained from the filtration of POME, which agent can be an organic solvent or some other agent inducing a respective phase transition of oil, and of re-filtering the mixture for separating the solid particles. Thus, the filtration included in the most advantageous embodiment of the invention produces fractions, wherein the components separating from each other are water and oil in the agent that has extracted the latter, as well as a substantially oil-free biomaterial originating from plant particles.

Accordingly, in a preferred embodiment according to the invention, the solid matter resulting from a first sand filtration is treated by supplementing said solids with a water-insoluble and oil-extraction agent, such as a fat solvent, and by allowing oil to travel into this water-insoluble agent. Another sand filtration is performed, whereby both the water having traveled along with the solids and the water-insoluble agent that has extracted oil migrate through the sand bed. These substances are allowed to separate into the intrinsic phases thereof passively or by applying methods which enhance the separation of phases on the basis of the specific weight, solubility, or density of liquids. The oil-containing water-insoluble phase is separated from the water phase. The water-insoluble extraction agent is separated from oil preferably at a temperature, which at the existing pressure corresponds to the boiling point of the agent, or at a temperature higher than that. After a partial or complete removal of the water-insoluble oil extraction agent, the oil is recovered. A preferred embodiment for a method of the invention is illustrated in FIG. 1.

One preferred embodiment for a method of the invention is to repeat the first sand filtration of POME, such that a solution resulting therefrom, i.e. a permeate, is conveyed to another filtration, which latter filtration can be conducted with a sand bed or some other separation agent, which, in terms of its structure, composition and/or particle size, can be the same as that used in the former filtration. The solids obtained from the latter filtration can be conveyed into solids resulting from the first filtration step, or can be treated separately according to the most preferred embodiment of the invention. The invention does not limit the number of filtration cycles, yet it is a part of even these embodiments of the invention that the oil is removed and recovered from solids obtained by the filtrations.

Instead of or in addition to sand, the filtration treatment of water containing oil in particulate form can be conducted by using other materials, by means of which the solid particles can be separated from other particle-free liquid stream.

It is within the scope of various embodiments of the invention that the water-insoluble fat extraction agent can be any oil extraction substance, which is insoluble or poorly soluble in water, or some other substance, which, when in contact with oil, is liquid or becomes liquid, and which, in its state having extracted oil, is insoluble in water or has a substantially poor solubility in water. Preferred oil extraction agents include for example non-polar organic solvents, other recyclable materials volatile at low temperatures. Preferred organic solvents include compounds containing alkanes and other hydrocarbon chains, for example hexane and heptane.

According to one embodiment of the invention, the water-insoluble fat extraction agent is a substance suitable for fuel application, for example biodiesel or a renewable transportation fuel. In this case, oil need not be necessarily separated from the water-insoluble extraction agent prior to the refining of fuel or the application of fuel.

A part of one preferred operation in a preferred embodiment of the invention is that the water-insoluble matter of POME is allowed to settle on the surface of an employed sand bed, or, as described above, on the surface of a similar material and/or within layers in the vicinity of the surface, such that the solids and/or the solids-containing layers are recoverable mechanically or with countercurrent extraction.

From a mixture containing both plant-based solids and sand bed material obtained in the sand filtrations of POME can be recovered the organic solids on the basis of unequal specific weights of these components by settling or by using other methods based on specific weights of the components, or by placing on the sand bed surface, prior to the filtration of POME, some screening material which develops an insulating layer and is readily permeable to water.

The invention does not limit the shape or size of a sand bed. Neither is the invention limited to the type of sand, its amount, grain size, or origin, but what is characteristic of the invention is that the oil-repellent properties of an separation agent accomplish the separation of plant-based solids from an aqueous phase.

According to the invention, the concept of sand comprises also other materials establishing a sand-bed type composition and having a granular mass, and having characterizing features, such that the bed composed of such materials is preferably gravitationally permeable to water and other liquids, adsorbs to its surface, or within layers in the vicinity of the surface, some mass of solid matter present in water contained in POME, and the grains of said bed do not substantially absorb fat within themselves. Applicable as a separation agent are thereby materials with particles capable of adsorbing to themselves a surface layer of a water, thus establishing an oil-repellent hydrophilic matrix.

The method according to the invention incorporates an option, wherein the solids mass developing in a first sand bed filtration can be treated with an oil-extraction agent in a pressurized condition. In this embodiment, it is preferred that the pressurization be conducted by recycling a compound volatile at low temperatures.

The scope of invention covers in all embodiments a treatment of solids recovered in the filtration of POME for the separation of oil.

The solids are treated with methods, which enable the oil to form a phase separating from the solids and from the water contained therein. In this purpose, the recovered aqueous solids mass is supplied with an oil-extracting, poorly water-soluble agent that is liquid, solid, or volatile at room temperature, such as an organic solvent, and a phase transition of oil is allowed to happen from the solids to the oil-extracting agent. The water-insoluble component having extracted oil, i.e. the agent that has extracted oil, is allowed to build a phase separable from water, which phase is recovered and from which is removed the oil-extracting agent, and this agent is preferably used again in a process of the invention. The retained oil is recovered and used as palm oil for the ordinary applications of this oil.

The water-insoluble extraction agent employed in the extraction process may be in any state of matter, such as solid, liquid, or gaseous.

The scope of invention covers also an embodiment, wherein solids recovered from the surface of a sand bed is contacted not with a liquid phase but instead with solid or semi-solid oil adsorbing materials for separating fat from the solid matter of POME separated according to the invention. Particularly preferred are materials which bind oil to themselves, or materials which first absorb the oil from water-oil mixtures.

The separation of oil from the agent, which has extracted oil, for a fraction having oil as its only or quantitatively dominating component, can be performed at an arbitrarily selected temperature and pressure. According to the invention, the separation of oil may incorporate stirring operations or other oil phase separation enhancing actions.

The oil produced by the method is recovered, used predominantly as transport biofuel, its raw material or component, or in the manufacture of soaps and oleochemicals, and the rest of the solids is used the same way as other low-fat biomasses. The water released in the process can be conducted to reuse or released into the environment after possible further purifying.

One preferred application for the oil recovered according to the invention is the manufacture of renewable transportation fuel, which refers to a transportation fuel, wherein acylglycerols or free fatty acids contained in oil are refined in hydrogen treatment into corresponding alkanes (paraffins). Alkanes can be conditioned by isomerization or other optional processes. The manufacturing process of renewable transportation fuel can be used for producing diesel, gasoline, or aviation fuel. In addition, the cracking of oil, or alkanes produced therefrom, is a way of producing diesel, gasoline, or aviation fuel. The recovered oil can be refined for transportation fuel by having it in a mixed form within fossil oil. The oil itself can also be used as biofuel. The recovered oil can also be used as a base oil in the manufacture of lubricants. The product can be supplemented with adjuvants, such as antioxidants and preservatives.

The oil recovery process according to the invention develops side stream fractions in the form of particle- and oil-free water, as well as plant-derived solids with very low oil content. The plant-derived solids can be used as a soil improver, for example on palm oil farms, as such or after composting. The plant-derived solids can be burned as well. In one alternative, the plant-derived solids are digested, the resulting biogas is recovered, and the biogas is burned or otherwise utilized.

The method according to the invention, along with its various embodiments, is applicable to the recovery of oil not only from POME but also from other colloidal or dispersion type aqueous solutions. In these embodiments, the recoverable oil also comprises other poorly water-soluble organic compounds capable of forming colloidal aqueous solutions.

EXAMPLES

Example 1

A test arrangement as shown in FIG. 1 was conducted with methods and starting values as follows.

POME was filtered with a sand filter, wherein a Buchner funnel of 10 cm in its inner diameter had 130 g layer of sea sand on top of a nonwoven fabric (Sea sand, pro analysis, Merck (Germany), grain size distribution 0.1 to 0.3 mm). The sand layer had a thickness of about 1 to 1.5 cm. On top of the sand layer was first laid a nylon mesh with a pore size of 400 µm to prevent the blending of sand and POME, but the mesh was removed during filtration. It was known from earlier tests that this particular type of mesh is not capable of filtering or concentrating POME and thereby not capable of making a difference in the filtration result.

Through the sand bed was filtered with suction filtration (water pump) 150 ml or 144 g of POME, which had been sterilized by autoclaving. POME had a pH of 3.5. Filtration was assisted by regular stirring of POME mass.

POME had a dry content of 62 g/l and the dry matter made up 6.3% of wet POME. Filtration resulted in a solution with a dry content of 38 g/l, and a precipitate with 12% dry matter of its wet weight. The solution clarified by settling had a brix of 3.75, i.e. the content of dissolved substances was about 37.5 g/l. Based on this, the solution primarily contained dissolved substances.

Cold-dried POME, solution, and precipitate samples were determined for the oil contents thereof. POME contained oil 17% of dry matter, i.e. 10.5 g/l. In the solution, the amount of oil had decreased significantly and the solution's dry matter had a fat content of 0.1%. In the precipitate, respectively, the fat content of dry matter had increased slightly and was 18% of dry matter.

In order to recover the oil from POME, a 21 gram precipitate sample was supplemented with 20 ml of a 2:1 dichloromethane-methanol solution. The mixture was incubated for a period of 1 h at 240 rpm shaking, after which the solids were separated from the mixture by filtering the mixture with suction filtration (water pump) through a sand filter as described above. Filtration was effected by using a nylon mesh (pore size 400 µm) between the POME-solvent mixture and the sand bed in order to prevent the POME mass from blending in with the sand. In order to separate the solvent phase from POME mass, pure hexane in excess amount was driven through the filtrate cake until the permeated hexane was light yellow. The solvent phase was recovered from extraction solution and the solvent was evaporated away. The oil yield was 303 mg. The oil yield from precipitate sample was 67% as the sample had a wet mass of 21 g, a dry content of 12%, and a dry matter fat content of 18%, i.e. the amount of oil was 456 mg. The cold-dried extracted precipitate sample was determined for its oil content and it was 6.5% of the dry matter. Based on the results, the solids of POME can be concentrated with a simple sand filtration. Sand filtration reduced significantly the dry content of through-filtered permeate, but especially its oil content, with respect to untreated POME. When the pH of POME was acidic, the oil contained in POME separated as a part of solids and can be recovered from the solids by means of solvent extraction. A single-stage extraction enabled reducing the oil content of concentrated POME precipitate by 10 percentage points with respect to non-extracted POME concentrate.

Example 2

Figure 2:
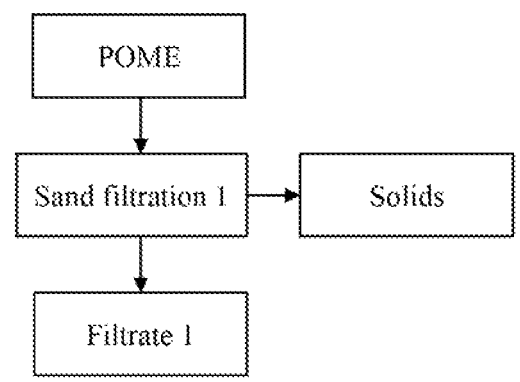
FIG. 2 provides a chart of a single-stage POME treatment example. POME: Volume: 150 ml; Mass: 143.7 g. Sand 1: Grain size: 0.1-0.3 mm; Mass: 129.6 g; Estimated mass in wet state (water absorption 1.22× dry weight): 160.0 g; Estimate for absorbed water: 28 g Solids: Mass obtained by scraping, wet weight: 36.9 g. Filtrate 1: Volume: 68 ml; Mass: 67.5 g. Balance: POME: 143.7 g; Solids: 36.9 g; Filtrate: 67.5 g; Estimate for liquid absorbed in sand: 28 g; Solids+filtrate+liquid absorbed in sand total 132.4 g.

Calculation for the mass balance of a single-stage POME filtration was based on the single-stage sand filtration of POME, the obtained fractions being solids and filtrate as shown in FIG. 2.

In order to calculate the balance, there was used 150 ml of POME sample with a mass of 143.7 g. The sample was filtered with a sand bed, the sand having a grain size of 0.1 to 0.3 mm. The sand had a mass of 129.6 g and, as a premise, its water absorption was 1.22× dry weight, i.e. 160 g. Thus, the estimated water absorption was 28 g. Sand filtration was conducted, the filtrate comprising 68 ml and the mass being 67.5 g. Based on the results, from the mass of POME, which was 243.7 g, was obtained solids in the amount of 36.9 g and filtrate in the amount of 67.5 g. The amount of water absorbed in sand is estimated at 28 g, whereby the solids, filtrate, and liquid absorbed in sand make up jointly a total of 132.4 g.

The invention claimed is:

1. A method for the recovery of oil from an aqueous solution containing oil and solids, the method comprising:
    adjusting an oil- and solids-containing aqueous solution to an acidic pH,
    separating an oil- and solids-containing fraction from the acidic aqueous solution with a separation agent which comprises particulate matter that is hydrophilic or assumes a hydrophilic character in response to water, wherein said separation agent is sand, having a grain size of 0.05 to 4 mm,
    recovering the oil- and solids-containing fraction separated by means of said separation agent,
    extracting oil away from solids with a water-insoluble extraction agent, and
    recovering the oil-containing water-insoluble extraction agent.

2. A method according to claim 1, wherein said solids are organic solids.

3. A method according to claim 2, wherein said aqueous solution consists of palm oil mill effluent (POME).

4. A method according to claim 1, wherein the pH of the oil- and solids-containing aqueous solution is adjusted to the range of 2.0 to 6.0.

5. A method according to claim 1, wherein the oil- and solids-containing fraction is separated from the acidic aqueous solution with one or more filtrations.

6. A method according to claim 1, wherein the water-insoluble extraction agent is a substance for a fuel application.

7. A method according to claim 1, wherein the method further comprises the following step of:
   separating the solids from the water-insoluble extraction agent, into which the oil has been extracted, with one or more filtrations.

8. A method according to claim 1, wherein the method further comprises the following step of:
   separating the oil from the water-insoluble extraction agent.

9. A method according to claim 8, wherein the water-insoluble extraction agent is liquid during extraction, and oil is separated from said water-insoluble extraction agent by evaporating the water-insoluble extraction agent.

10. The method according to claim 1, further comprising treating the extracted oil with hydrogen to produce a renewable transportation fuel, a lubricant, or a raw material for processes to manufacture transportation fuels or lubricant components.

11. The method according to claim 6, wherein the fuel application is biodiesel or a renewable transportation fuel.

\* \* \* \* \*